Patented Dec. 13, 1927.

1,652,711

UNITED STATES PATENT OFFICE.

HANS EGGERT, OF WOLTERSDORF, NEAR ERKNER, GERMANY.

PROCESS OF MAKING SUBSTITUTES FOR HORN AND IVORY FROM VISCOSE.

No Drawing. Application filed March 26, 1924, Serial No. 702,130, and in Germany December 29, 1922.

It is well known that viscose (sodium cellulose xanthogenate solution), coagulates on long standing and heating i. e. it is converted into an insoluble substance. When the substance thus obtained has been freed from alkali metal hydroxide and alkali metal sulphides by long washing and by drying, a horny substance is obtained which may be used for various useful articles. It is known as "viscoid" and may be used as a substitute for horn or vegetable ivory (or stone nut substitute).

The most difficult operation to carry out in the manufacture of viscoid is the washing process. It is extremely difficult to remove by lixiviation the alkali metal hydroxide and alkali metal sulphide, especially from large pieces which require at least 30 days washing.

Owing to the extended lixiviation, the substance undergoes alteration in consequence of which even after drying it is inclined to suffer a change in condition or form. Even in dry condition when stored it exhibits little durability as it slowly disintegrates by cracking or crumbling.

My invention is based on the discovery that the above mentioned defects may be overcome by treating the crude or preliminarily purified sodium cellulose xanthogenate solutions with heavy metal salts or alkaline earth compounds. For this treatment such salts are selected which readily give off their inorganic or organic acid radicals to the alkali (sodium hydroxide or sodium sulphide). Such metallic oxides and metallic hydroxides as form compounds with alkali metal hydroxids and alkali metal sulphides, (for example aluminum or zinc hydroxides) may also be employed with a good result. The reaction must be carried out slowly and gradually by a correct selection and regulation of the temperature during the treatment, in order that the viscose may not be prematurely converted into an insoluble condition, i. e. before it is introduced into the moulds.

For many useful articles, the product thus obtained by the above process before final washing with water may be subjected to treatment with substances which fix the heavy metals or alkali earth metals for instance by treating the sodium aluminate formed with calcium chloride, whereby insoluble calcium aluminate is formed in the mass and also sodium chloride which is easily removed by washing.

*Example I.*

100 kilograms crude or preliminarily purified viscose (containing about 7 kilograms alkali) are before coagulation thoroughly agitated in a kneading machine with an excess of about 16 kilograms (calculated when dry) of aluminum hydroxide under continuous cooling to 15 degrees centigrade (if necessary employing vacuum in order to remove air bubbles). The reaction substance obtained is cast in moulds and left to itself to harden (eventually under heating). When coagulation has taken place a short washing for about 5 days will suffice. In fixing the aluminum in the mass it is treated, before being washed for example with a saturated solution of calcium chloride solution, with or without heating, then thoroughly washed and finally dried.

*Example II.*

7 kilograms (calculated dry) freshly precipitated iron oxide is slowly kneaded or agitated for about two hours in 100 kilograms crude or preliminarily purified viscose and then when reaction has taken place (which can be easily ascertained from the dark color) about 9 kilograms of zinc oxide are added in small portions and thoroughly agitated in vacuo. Reaction temperature is 10 degrees centigrade. After coagulation in moulds it is washed for about 3–4 days and then dried.

*Example III.*

About 17 kilograms of calcium acetate is kneaded or agitated in small portions (in vacuo) in 100 kilograms of crude or preliminarily purified viscose and well cooled to +5 degrees centigrade. After about two hours mixing the mass is cast in moulds and left to harden. After coagulation the mass is washed in running water for about three days and then dried.

Coagulation is rather a polymerization of cellulose xanthogenic acid (xanthogenate) molecule with the separation out of the sodium as sodium sulfid or in some other form.

This invention is not predicated upon a process for forming heavy metal compounds with a viscose but rather upon a process in which the heavy metal compounds are employed to combine with the accompanying products which are free in the viscose and which exert an injurious influence on the washing process and thereby on the entire substance.

I claim:

1. The process for the manufacture of a horn or vegetable ivory substitute which comprises treating freshly prepared viscose with aluminum hydroxide to combine with the alkali metal hydroxide and sulphide present and then treating the mixture with a solution of calcium chlorid.

2. The process for the manufacture of a horn or vegetable ivory substitute which comprises treating viscose before coagulation with aluminum hydroxid to combine with the alkali metal hydroxide and sulphide present and at the same time maintaining a temperature of approximately 15 degrees centigrade permitting the thus treated mass to coagulate and harden and then fixing the aluminum in the mass by adding a solution of calcium chlorid.

3. The process for the manufacture of a horn or vegetable ivory substitute which comprises treating viscose before coagulation with aluminum hydroxid to combine with the alkali metal hydroxide and sulphide present and at the same time maintaining a temperature of approximately 15 degrees centigrade, fixing the aluminum in the mass by adding a solution of calcium chlorid and then washing the final product.

4. The process for the manufacture of a horn or vegetable ivory substitute which comprises thoroughly agitating 100 kilograms of sodium cellulose xanthate with approximately 16 kilograms of aluminum hydroxid to combine with the alkali metal hydroxide and sulphide present and at the same time cooling the mixture to approximately 15 degrees centigrade, permitting the mass to coagulate and harden and then fixing the aluminum in the mass with a saturated solution of calcium chlorid then washing the mass.

5. The process for the manufacture of a horn or vegetable ivory substitute which comprises treating freshly prepared viscose with a heavy metal compound having amphoteric qualities which is soluble in the viscose to combine with free alkali metal hydroxid and alkali metal sulphide present in the viscose and then converting the heavy metal salt into an insoluble one for fixing said heavy metal in the viscose by the use of calcium chloride.

6. The process for the manufacture of a horn or vegetable ivory substitute which comprises treating freshly prepared viscose with a heavy metal compound which is soluble in the viscose to combine with free alkali metal hydroxid and alkali metal sulphide present in the viscose at the same time maintaining the mass at approximately 15 degrees and then converting the heavy metal salt into an insoluble one for fixing said heavy metal in the viscose by the use of calcium chloride.

7. The process for the manufacture of a horn or vegetable ivory substitute which comprises treating freshly prepared viscose with a heavy metal compound which is soluble in the viscose to combine with free alkali metal hydroxid and alkali metal sulphide present in the viscose at the same time maintaining the mass at approximately 15 degrees, removing air from the cooled mass, and then converting the heavy metal salt into an insoluble one for fixing said heavy metal in the viscose by the use of calcium chloride.

In testimony whereof I have signed my name to this specification.

HANS EGGERT.